United States Patent Office 3,332,778
Patented July 25, 1967

3,332,778
SUPPLYING AT LEAST ABOUT 4% IRON AND A SWEETENING AGENT FOR THE PREVENTION OF IRON-DEFICIENCY ANEMIA IN BABY PIGS
Marvin C. Wilkening, Decatur, Ala., assignor to Nebraska Consolidated Mills Company, Omaha, Nebr., a corporation of Nebraska
No Drawing. Filed July 28, 1964, Ser. No. 385,753
4 Claims. (Cl. 99—2)

This invention relates to preparations, and methods utilizing the same, for the prevention of iron-deficiency anemia in baby pigs.

The significantly high mortality rate of baby pigs suffered by hog raisers (in the decade 1940–1950 often 25% of the pigs farrowed died before weaning age) is attributable to anemia caused by iron deficiency. Iron-deficiency anemia is almost universal among baby pigs reared in confinement without a supplemental source of iron.

The danger of iron-deficiency anemia occurs within the first three or four weeks of life. During this period the baby pig lives by natural preference on the sow's milk which has a very low iron content. The etiology for the iron-deficiency anemia in baby pigs is a combination of low iron content in the sow's milk, low amount of iron in the baby pig at birth, and a rapid rate of growth.

Iron-deficiency anemia can be prevented by a supplemental supply of iron, provided the anemia has not become so severe as to produce permanent damage. The history of swine husbandry reveals a wide variety of practices to supplement iron in baby pigs.

For decades it was the custom to throw black dirt and sod containing grass and grass roots into the pen of nursing sows, particularly if the weather or circumstances did not allow the baby pigs to run on the farm land and eat solid food. Scientific investigations revealed that the sod supplied iron compounds necessary to prevent iron-deficiency anemia. Baby pigs rooting in the sod ingested sufficient dirt containing iron to prevent the iron deficiency.

The use of black dirt and sod is an undesirable procedure for many reasons. The baby pigs do not obtain sufficient iron in all cases by this practice to supply the deficiency. The iron content of the soil is usually unknown, so that the results are unpredictable. Other dangers are presented to the baby pig. Internal parasites may be ingested. Infectious diseases otherwise prevented by sanitary conditions in the pen may be spread.

More modern methods are currently practiced to prevent the iron deficiency, including iron supplementation by parenteral or oral administration. Standard practice today is injection of iron compounds in the ham of the pig at regular intervals. This procedure is expensive, laborious, requires restraint during administration, and demands special equipment. Furthermore, the injection sometimes sufficiently injures the ham of the pig as to cause its rejection in the market.

Iron compounds have been introduced orally in the suckling pig by drenching or the use of balling irons. This forced treatment requires repeated administration of the iron, close confinement, restraint of the baby pigs, and many hours of labor.

Unsatisfactory results have been obtained with ad libitum consumption of feeds containing iron compounds during the early post-natal life. Chaney et al. "The Effect of Iron Supplementation on the Prevention of Anemia in Baby Pigs," American Journal of Veterinary Research, vol. 25, No. 105, pages 420–423, March 1964, indicates the unsatisfactory results of experiments on prevention of anemia in baby pigs by ad libitum feeding. This publication reports studies of the effects of adding ferrous fumarate, ferrous gluconate, ferrous lactate, and iron reduced by hydrogen to starter rations. It concludes that the levels of iron supplementation of feed intake were not adequate to prevent anemia. Although modifications were made in the basic ration, increased feed intake was not apparent.

The present invention is based on discovery that the inclusion of iron compounds in high amounts in a preparation placed in the pen will be ingested at levels to compensate for the iron-deficiency in baby pigs. The discovery relates to supplying the iron, assuming small, perhaps only occasional, ad libitum consumption of a preparation containing at least one iron compound. The discovery also relates to maintaining the iron at high levels, so that only small amounts of the preparation need be ingested to prevent iron-deficiency during the critical period.

Briefly stated, the present invention is directed to a preparation, and method of using same, containing an iron compound in admixture with a carrier. The iron of said iron compound is present in the preparation in amounts of at least about 1% by weight on an elemental iron basis. The carrier preferably contains a sweetening agent to attract the baby pigs.

Various iron compounds may be employed, such as iron salts, iron dextran complexes, colloidal iron materials and the like. The iron salts are preferably of weak acids, since the strong acid salts tend to produce enteritis. Suitable iron salts include ferrous fumarate, ferrous gluconate, ferrous lactate, ferrous carbonate, ferric ammonium citrate, ferric choline citrate, ferric chelate complex, ferric phosphate, pyrophosphate, and the like. It is understood that these salts may be used singly, or in combination. It will be realized that for some purposes some of the foregoing iron compounds may be more desirable than others. Special preference is given to ferrous fumarate.

In order for the oral preparation to be effective in preventing anemia the iron must be present in high amounts. The iron must be present on an elemental iron basis of at least about 1% by weight, preferably at least about 4% by weight, and most desirably at least about 6.5% by weight.

The iron compound is admixed with a carrier to make the oral preparation attractive to the baby pigs. The carrier may be a pre-starter feed that supplies supplemental protein and minerals. Generally baby pigs consume very little feed pre-starter if the sow is milking. The baby pigs prefer the sow's milk to feeds. In order for the pre-starter to be effective in preventing anemia it must be highly palatable. The carrier, therefore, must contain ingredients to make the preparation attractive to baby pigs. It is another discovery of the present invention that a sweetening agent in the preparation accomplishes this purpose. Suitable sweetening agents include sucrose, dextrose, lactose, or synthetic sweetening agents, such as saccharin. The sweetening agent must be present in amounts sufficient to attract the baby pigs, for example, from about 10 to about 14 percent by weight of the preparation.

The preparation of the invention may be placed in the pig pen for the first 21 days of the baby pig's life. The preparation of the invention is fed ad libitum by merely placing the preparation in pans for consumption by the baby pigs.

In order to further illustrate the invention the following example is given. It should be understood, however, that the example is given only by way of illustration and not for limitation of the scope of the invention.

*Example*

The objective of this experiment was to test a very palatable pig ration high in iron for the prevention of baby pig anemia. Three replications of 12 litters of day-old crossbred pigs were used to give a total of 36 litters. There was a 6–8 week time lapse between replications. There were 12 litters for each of the following treatments:

*Treatment 1.*—Positive Control—one iron-dextran injection (intramuscularly) at 2–5 days, and another one at 21 days. "Red Hat" Pig Starter was introduced at one week of age.

*Treatment 2.*—Experimental Swine Ration No. 5 containing ferrous fumarate was fed ad libitum in baby pig creep pans for 21 days. "Red Hat" Pig Starter was introduced after 21 days. The sows feces was removed from the pen daily to lessen the chance of the pigs eating the sows' feces.

*Treatment 3.*—Negative Control—no iron-dextran injection, no Experimental Swine Ration No. 5; "Red Hat" Pig Starter introduced at one week of age. The sows' feces was removed from the pen daily also.

All the sows were fed "Red Hat" Sow Ration. Each pig was numbered by the ear-notch system to maintain identity of the pig throughout the experiment. Each pen containing a sow and litter was also given a number to maintain identity of the litter throughout the experiment.

Individual pig weights at day 1, 7 days, 14 days, 21 days, and 35 days (weaning) were recorded. The amount of feed consumed by litter was maintained until time of weaning. Mortality, including date of death and cause of death, was also maintained individually. Blood samples were taken each time the pigs were weighed for hematocrit and hemoglobin determinations.

The results of the experiments are shown in the tables below.

The composition of Experimental Swine Ration No. 5 used in the experiments was as follows:

| Ingredient: | Percent |
|---|---|
| Yellow corn meal | 25.0 |
| Sugar (sucrose) | 10.0 |
| Wheat middlings | 5.0 |
| Fish meal (65%) | 5.0 |
| Dried whey | 10.0 |
| Fat (60% vegetable, 40% animal) | 3.0 |
| Dried buttermilk | 10.0 |
| Dried skim milk | 10.0 |
| Iron fumarate | 20.0 |
| Pig blend [1] | 1.0 |
| Defluorinated phosphate (18%) | 0.8 |
| Swine mineral mix [2] | 0.2 |
| Total | 100.0 |

[1] Pig Blend—Ingredient:

| | Percent |
|---|---|
| Vitamin A (30,000 I.U./gm.) | 1.47 |
| Vitamin D-3 (15,000 I.U./gm.) | 1.10 |
| Riboflavin (4 gm./lb.) | 3.75 |
| Nop-Cap 64 (58.8 gm./lb. of pantothenic acid) | 0.85 |
| 50% niacin (227 gm./lb.) | 0.42 |
| Vitamin B-12 supplement (60 mg./lb.) | 1.17 |
| 37½% choline chloride (147.5 gm./lb.) | 25.42 |
| T.M.-50 (50 gm. oxytetracycline/lb.) | 2.58 |
| BHT (a preservative) | 0.62 |
| Pig Nectar (a sweetening agent) | 5.00 |
| Dried corn fermentation solubles (a carrier) | 57.62 |
| Total | 100.00 |

[2] Swine Mineral Mix—Element:

| | Percent |
|---|---|
| Manganese | 6.00 |
| Iron | 2.00 |
| Copper | 0.20 |
| Cobalt | 0.02 |
| Iodine | 0.12 |
| Zinc | 2.50 |
| Calcium | 24.00 |

TREATMENT 1.—POSITIVE CONTROL

| | Litter | Day #1 | | 1 Week | | 2 Weeks | | 3 Weeks | |
|---|---|---|---|---|---|---|---|---|---|
| | | Pounds | Ounces | Pounds | Ounces | Pounds | Ounces | Pounds | Ounces |
| Weight | 1 | 3 | 7.8 | 5 | 12.6 | 8 | 15.8 | 11 | 12.6 |
| | 4 | 2 | 13.8 | 5 | 8.0 | 8 | 11.8 | 12 | 6.5 |
| | 7 | 2 | 15.6 | 5 | 14.1 | 8 | 10.6 | 10 | 14.7 |
| | 10 | 2 | 11.2 | 5 | 3.8 | 7 | 6.8 | 9 | 15.6 |
| | 13 | 2 | 15.4 | 5 | 2.9 | | | 10 | 6.5 |
| Average | | 2 | 15.9 | 5 | 8.3 | 8 | 7.2 | 11 | 1.6 |
| PCV | 1 | 29.3 | | 33.1 | | 34.1 | | 33.0 | |
| | 4 | 36.8 | | 37.3 | | 35.1 | | 33.1 | |
| | 7 | 34.4 | | 30.1 | | 30.1 | | 31.6 | |
| | 10 | 31.5 | | 26.8 | | 36.5 | | 38.1 | |
| | 13 | 37.3 | | 35.5 | | | | 37.9 | |
| Average | | 33.9 | | 32.6 | | 33.95 | | 34.7 | |
| Hb | 1 | 9.8 | | 11.0 | | 11.3 | | 11.0 | |
| | 4 | 12.2 | | 12.4 | | 11.7 | | 11.1 | |
| | 7 | 11.5 | | 10.1 | | 10.0 | | 10.5 | |
| | 10 | 10.6 | | 9.0 | | 12.2 | | 12.7 | |
| | 13 | 12.4 | | 11.8 | | | | 12.8 | |
| Average | | 11.3 | | 10.9 | | 11.3 | | 11.6 | |

TREATMENT 2.—FERROUS FUMARATE

| | Litter | Day #1 | | 1 Week | | 2 Weeks | | 3 Weeks | |
|---|---|---|---|---|---|---|---|---|---|
| | | Pounds | Ounces | Pounds | Ounces | Pounds | Ounces | Pounds | Ounces |
| Weight | 2 | 3 | 4.2 | 6 | 10.6 | 11 | 1.3 | 16 | 7.9 |
| | 5 | 2 | 15.3 | 5 | 13.4 | 9 | 3.0 | 12 | 2.9 |
| | 8 | 3 | 0.3 | 4 | 10.9 | 6 | 0.4 | 8 | 3.6 |
| | 11 | 2 | 15.9 | 4 | 15.5 | 6 | 10.2 | 8 | 6.8 |
| Average | | 3 | 0.9 | 5 | 8.6 | 8 | 3.7 | 11 | 5.3 |
| PCV | 2 | 28.4 | | 33.6 | | 38.1 | | 37.6 | |
| | 5 | 36.6 | | 37.0 | | 42.7 | | 34.4 | |
| | 8 | 38.2 | | 38.4 | | 38.9 | | 34.4 | |
| | 11 | 32.5 | | 30.7 | | 33.6 | | 29.7 | |
| Average | | 33.9 | | 34.9 | | 38.3 | | 34.00 | |
| Hb | 2 | 9.5 | | 11.2 | | 12.7 | | 12.5 | |
| | 5 | 12.8 | | 12.3 | | 14.3 | | 11.5 | |
| | 8 | 12.7 | | 10.2 | | 12.9 | | 11.5 | |
| | 11 | 10.8 | | 10.2 | | 11.2 | | 9.9 | |
| Average | | 11.4 | | 11.0 | | 12.8 | | 11.3 | |

PCV=Packed Cell Volume (percent).
Hb=Hemoglobin determination (gm./100 ml.).

TREATMENT 3.—NEGATIVE CONTROL

|  | Litter | Day #1 | | 1 Week | | 2 Weeks | | 3 Weeks | |
|---|---|---|---|---|---|---|---|---|---|
|  |  | Pounds | Ounces | Pounds | Ounces | Pounds | Ounces | Pounds | Ounces |
| Weight | 3 | 2 | 15.9 | 5 | 8.9 | 7 | 4.4 | 9 | 1.8 |
|  | 6 | 3 | 8.5 | 6 | 8.3 | 8 | 12.0 | 10 | 10.4 |
|  | 9 | 3 | 8.5 | 6 | 4.9 | 7 | 3.8 | 7 | 12.1 |
|  | 12 | 2 | 13.7 | 4 | 0.4 | 5 | 4.0 | 6 | 8.0 |
| Average |  | 3 | 3.6 | 5 | 9.6 | 7 | 2.0 | 8 | 8.1 |
| PCV | 3 | 33.7 |  | 26.4 |  | 21.4 |  | 19.6 |  |
|  | 6 | 37.8 |  | 29.2 |  | 22.7 |  | 18.5 |  |
|  | 9 | 30.2 |  | 24.6 |  | 23.4 |  | 23.2 |  |
|  | 12 | 39.0 |  | 38.4 |  | 32.3 |  | 30.0 |  |
| Average |  | 35.2 |  | 29.6 |  | 24.9 |  | 22.8 |  |
| Hb | 3 | 11.3 |  | 9.1 |  | 7.2 |  | 6.6 |  |
|  | 6 | 12.6 |  | 9.8 |  | 7.6 |  | 6.2 |  |
|  | 9 | 10.1 |  | 8.2 |  | 7.8 |  | 7.8 |  |
|  | 12 | 13.0 |  | 12.9 |  | 9.7 |  | 10.0 |  |
| Average |  | 11.7 |  | 10.0 |  | 8.1 |  | 7.6 |  |

PCV = Packed Cell Volume (percent).
Hb = Hemoglobin determination (gm./100 ml.).

The amount of the iron compound in the preparation on an elemental iron basis may be reduced if the feed is made more attractive to the baby pigs. Thus, in using lower limits in the amounts of the iron compound in the feed preparation, it may be desirable to increase the amount of sweetening agent. For practical purposes the upper limit of the iron compound may be approximately 40% by weight.

Other modes of applying the principles of the invention may be employed, change being made as regards the details described, provided the features stated in any of the following claims or the equivalent of such be employed.

I, therefore, particularly point out and distinctly claim as my invention:

1. The process for preventing anemia in baby pigs which comprises the steps of supplying to nursing baby pigs from 1 to about 30 days old for ad libitum consumption in competition to the sow's milk a composition containing a non-toxic, ingestible iron compound in admixture with a sweetening agent, the iron of said iron compound comprising at least about 4% by weight of said composition on an elemental iron basis, said sweetening agent being present in effective amounts for attracting the baby pigs in copetition to the sow's milk.

2. The process of claim 1 wherein said iron compound is ferrous fumarate.

3. The process of claim 1 wherein the iron is present in amounts of at least about 6.5% by weight on an elemental iron basis.

4. The process of claim 1, wherein said iron compound is ferrous fumarate, and wherein said iron is present in said composition in amounts of at least about 6.5% by weight on an elemental iron basis.

References Cited

UNITED STATES PATENTS 2,848,366  8/1958  Bertsch et al. _____ 99—2
2,985,559  5/1961  Coles _____ 99—21

FOREIGN PATENTS 624,619  1/1962  Belgium.

OTHER REFERENCES

Feedstuffs, Feb. 13, 1960, p. 50.

A. LOUIS MONACELL, *Primary Examiner.*

D. DONOVAN, *Assistant Examiner.*